(12) United States Patent
Barooah et al.

(10) Patent No.: US 10,047,968 B2
(45) Date of Patent: Aug. 14, 2018

(54) COMFORTABLE, ENERGY-EFFICIENT CONTROL OF A HEATING, VENTILATION, AND AIR CONDITIONING SYSTEM

(71) Applicant: University of Florida Research Foundation, Incorporated, Gainesville, FL (US)

(72) Inventors: Prabir Barooah, Gainesville, FL (US); Rahul Subramany, Gainesville, FL (US); Siddharth Goyal, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 83 days.

(21) Appl. No.: 15/102,895

(22) PCT Filed: Dec. 11, 2014

(86) PCT No.: PCT/US2014/069772
§ 371 (c)(1),
(2) Date: Jun. 9, 2016

(87) PCT Pub. No.: WO2015/089295
PCT Pub. Date: Jun. 18, 2015

(65) Prior Publication Data
US 2017/0030603 A1    Feb. 2, 2017

Related U.S. Application Data

(60) Provisional application No. 61/915,285, filed on Dec. 12, 2013.

(51) Int. Cl.
*G05B 13/00* (2006.01)
*G05B 15/00* (2006.01)
(Continued)

(52) U.S. Cl.
CPC ............ *F24F 11/006* (2013.01); *F24F 11/30* (2018.01); *F24F 11/62* (2018.01); *G05B 19/406* (2013.01);
(Continued)

(58) Field of Classification Search
CPC ........... F24F 2011/0068; F24F 11/0034; F24F 2011/0035; G05D 23/1931; G05D 23/24; G05B 2219/2614
(Continued)

(56) References Cited

U.S. PATENT DOCUMENTS 4,205,381 A    5/1980  Games et al.
4,437,608 A    3/1984  Smith
(Continued)

FOREIGN PATENT DOCUMENTS

WO    WO 2009/117695 A1    9/2009
WO    WO 2017/004487 A1    1/2017

OTHER PUBLICATIONS

Barooah et al., Spectral decomposition of demand-side flexibility for reliable ancillary services in a smart grid. Proceedings of the 48th Annual Hawaii International Conference on System Sciences (Hicss). Kauai, Hawaii. 2015;2700-9. 10 pages.
(Continued)

*Primary Examiner* — Michael J Brown
(74) *Attorney, Agent, or Firm* — Alson & Bird LLP

(57) ABSTRACT

A system for controlling at least one heating, ventilation, and/or air conditioning unit to increase efficiency while maintaining comfort. The system comprises at least one computer. The at least one computer is configured to receive an indication of measured occupant load. The at least one computer is further configured to send a control signal to the at least one heating, ventilation, and/or air conditioning unit. The at least one computer may receive the indication of the
(Continued)

measured occupant load by receiving from at least one sensor node at least a zone occupant quantity and a zone temperature. The at least one computer may send the control signal to the at least one heating, ventilation, and/or air conditioning unit by sending a signal that controls at least one variable air volume box to set a supply air flow rate and a supply air temperature based on the measured occupant load.

21 Claims, 5 Drawing Sheets

(51) Int. Cl.

| | | |
|---|---|---|
| F24F 11/00 | (2018.01) | |
| F24F 11/30 | (2018.01) | |
| F24F 11/62 | (2018.01) | |
| G05B 19/406 | (2006.01) | |
| F24F 110/10 | (2018.01) | |
| F24F 110/20 | (2018.01) | |
| F24F 120/10 | (2018.01) | |
| F24F 11/64 | (2018.01) | |
| F24F 11/46 | (2018.01) | |

(52) U.S. Cl.
CPC ............... *F24F 11/46* (2018.01); *F24F 11/64* (2018.01); *F24F 2110/10* (2018.01); *F24F 2110/20* (2018.01); *F24F 2120/10* (2018.01); *G05B 2219/2614* (2013.01)

(58) Field of Classification Search
USPC .................................................. 700/276.277
See application file for complete search history.

(56) References Cited

U.S. PATENT DOCUMENTS

| | | | |
|---|---|---|---|
| 5,598,349 A | 1/1997 | Elliason et al. | |
| 5,632,154 A | 5/1997 | Sibik et al. | |
| 6,227,961 B1 | 5/2001 | Moore et al. | |
| 6,349,883 B1* | 2/2002 | Simmons | F24F 11/006 165/209 |
| 7,130,719 B2 | 10/2006 | Ehlers et al. | |
| 7,155,912 B2 | 1/2007 | Enis et al. | |
| 7,536,240 B2 | 5/2009 | McIntyre et al. | |
| 7,830,037 B2 | 11/2010 | Hirst | |
| 8,335,593 B2 | 12/2012 | Johnson et al. | |
| 8,376,242 B1 | 2/2013 | Uselton | |
| 8,428,785 B2 | 4/2013 | Boucher et al. | |
| 8,712,594 B2 | 4/2014 | De Ridder | |
| 9,366,451 B2 | 6/2016 | Guo et al. | |
| 2002/0190577 A1 | 12/2002 | Jenni | |
| 2003/0193244 A1 | 10/2003 | Dodson, III | |
| 2003/0223172 A1 | 12/2003 | Priest | |
| 2006/0116067 A1 | 6/2006 | Federspiel | |
| 2007/0240437 A1* | 10/2007 | Yonezawa | F24F 11/30 62/176.1 |
| 2008/0082277 A1 | 4/2008 | Holmquist et al. | |
| 2008/0238208 A1 | 10/2008 | Potter et al. | |
| 2008/0277486 A1 | 11/2008 | Seem et al. | |
| 2011/0002241 A1 | 1/2011 | Phan | |
| 2012/0020831 A1 | 1/2012 | Tanaka et al. | |
| 2012/0041696 A1 | 2/2012 | Sanderford, Jr. et al. | |
| 2012/0072030 A1 | 3/2012 | Elliott | |
| 2012/0185728 A1 | 7/2012 | Guo et al. | |
| 2012/0215368 A1 | 8/2012 | Sharma | |
| 2012/0217803 A1 | 8/2012 | Talkin et al. | |
| 2012/0232702 A1 | 9/2012 | Vass et al. | |
| 2012/0239205 A1 | 9/2012 | Frerking | |
| 2012/0259469 A1 | 10/2012 | Ward et al. | |
| 2012/0259471 A1 | 10/2012 | De Ridder | |
| 2012/0273980 A1 | 11/2012 | Meirav | |
| 2012/0296482 A1 | 11/2012 | Steven et al. | |
| 2012/0323637 A1 | 12/2012 | Cushing et al. | |
| 2013/0013121 A1 | 1/2013 | Henze et al. | |
| 2013/0038470 A1 | 2/2013 | Niemeyer et al. | |
| 2013/0085616 A1 | 4/2013 | Wenzel | |
| 2013/0317959 A1 | 11/2013 | Joos et al. | |
| 2014/0039709 A1 | 2/2014 | Steven et al. | |
| 2014/0148953 A1 | 5/2014 | Nwankpa et al. | |
| 2014/0167513 A1 | 6/2014 | Chang et al. | |
| 2014/0277757 A1* | 9/2014 | Wang | G05D 23/1927 700/276 |
| 2014/0336840 A1 | 11/2014 | Geinzer et al. | |
| 2014/0339316 A1 | 11/2014 | Barooah et al. | |
| 2015/0027138 A1 | 1/2015 | Schuster et al. | |
| 2016/0161928 A1 | 6/2016 | Bobker et al. | |
| 2016/0261116 A1 | 9/2016 | Barooah et al. | |

OTHER PUBLICATIONS

Bušić et al., Distributed randomized control for demand dispatch. arXiv:1603.05966v1. Mar. 18, 2016. 18 pages.
Bušić et al., Ordinary Differential Equation Methods for Markov Decision Processes and Application to Kullback-Leibler Control Cost. arXiv:1605.04591. Oct. 22, 2016. 23 pages.
Bušić et al., Passive dynamics in mean field control. Proceedings of the 53rd IEEE Conference on Decision and Control. arXiv:1402.4618v2. Sep. 24, 2014;2716-21. 7 pages.
Chen et al., Ergodic theory for controlled Markov chains with stationary inputs. arXiv:1604.04013. Jun. 18, 2016. 26 pages.
Chen et al., Individual risk in mean field control with application to demand dispatch. Proceedings of the 53rd IEEE Conference on Decision and Control. arXiv:1409.6941. Sep. 24, 2014. 11 pages.
Chen et al., State estimation for the individual and the population in mean field control with application to demand dispatch. arXiv:1504.00088 . May 30, 2016. 12 pages.
Kwakernaak, Robust control and H∞ optimization tutorial paper. J Automatica. Mar. 1993;29(2):255-73.
Mathias et al., Demand dispatch with heterogeneous intelligent loads. Proceedings of the 50th Hawaii International Conference on System Sciences (HICSS). Jan. 2017;3138-47.
Mathias et al., Smart fridge / dumb grid? demand dispatch for the power grid of 2020. Proceedings of the 49th Annual Hawaii International Conference on System Sciences (HICSS). Online at arXiv:1509.01531. Jan. 2016;2498-507. 12 pages.
International Search Report and Written Opinion dated Mar. 16, 2015 for Application No. PCT/US2014/069772.
[No Author Listed], Annual Energy Review 2010. U.S. Energy Information Institute DOE/EIA-0384(2010). Oct. 19, 2011. 407 pages.
Agarwal et al., Duty-Cycling Buildings Aggressively: The Next Frontier in HVAC Control. Information Processing in Sensor Networks (IPSN). Apr. 2011;246-57. 12 pages.
ASHRAE, 2011 ASHRAE Handbook: HVAC applications. SI Edition. Oct. 17, 2011. 1104 pages.
Hedrick, ASHRAE Standard 62.1-2010: Ventilation for Acceptable Indoor Air Quality. ASHRAE. Presentation. 2010. 68 pages.
Brambley et al., Advanced sensors and controls for building applications: Market assessment and potential R&D pathways. Pacific Northwest National Laboratory. Technical Report. PNNL-15149. Apr. 2005. 162 pages.
Cheng et al., A robust control strategy for VAV AHU systems and its application. Adv Intel Soft Comp. 2012;133: 635-42.
Cho et al., Application of terminal box optimization of single-duct air-handling units. Int J Energy Res. Jan. 2010;34(1):54-66.
Erickson et al., Occupancy Based Demand Response HVAC Control Strategy. BuildSys 2010. Nov. 2, 2010. 6 pages.
Goyal et al., A method for model-reduction of nonlinear building thermal dynamics of multi-zone buildings. Energy Bldg. Apr. 2012;47:332-40.
Goyal et al., Energy-efficient control of an air handling unit for a single-zone VAV system. 52$^{nd}$ IEEE Conference on Decision and Control. Mar. 11, 2013. 8 pages.

(56) References Cited

OTHER PUBLICATIONS

Goyal et al., Occupancy-Based Zone-Climate Control for Energy-Efficient Buildings: Complexity vs. Performance. Appl Energy. Jun. 2013;106(C):209-21.
Lin et al., Issues in identification of control-oriented thermal models of zones in multi-zone buildings. 51$^{st}$ IEEE Conference on Decision and Control. Dec. 10-13, 2012;6932-7.
Mossolly et al., Optimal control strategy for a multi-zone air conditioning system using a genetic algorithm. Energy. Jan. 2009;34(1):58-66.
Nassif et al., Optimization of HVAC control system strategy using two-objective genetic algorithm. HVAC&R Research. Jul. 2005;11(3):459-86.
Rahman et al., Energy conservation measures in an institutional building in sub-tropical climate in Australia. Appl Energy. Oct. 2010;87:2994-3004.
Široký et al., Experimental analysis of model predictive control for an energy efficient building heating system. Appl Energy. Apr. 2011;88:3079-87.
Wächter et al., On the implementation of an interior-point filter line-search algorithm for large-scale nonlinear programming. Math Prog Ser A. Apr. 28, 2005;106:25-57. 33 pages.
Wang et al., Model-based optimal control of VAV airconditioning system using genetic algorithm. Bldg Environ. Jan. 2000;35(6):471-87.
International Search Report and Written Opinion dated Jan. 21, 2015 for Application No. PCT/US2014/061508.
[No Author Listed], Agricultural demand response program in California helps farmers reduce peak electricity usage, operate more efficiently year-round. Case Study—M2M Smart Grid Investment Grant. 2012:1-3.
[No Author Listed], BPA Balancing Authority Load and Total Wind, Hydro, and Thermal Generation, Near-Real-Time. Bonneville Power Authority. http://transmission.bpa.gov/business/operations/Wind/baltwg.aspx [last accessed Jul. 26, 2016]. 2 pages.
[No Author Listed], Buildings Energy Data Book. 2011. United States Department of Energy. Mar. 2012. 285 pages.
[No Author Listed], First "Small Scale" Demand-side Projects in PJM Providing Frequency Regulation. PR Newswire. Nov. 21, 2011. http://www.prnewswire.com/news-releases/first-small-scale-demand-side-projects-in-pjm-providing-frequency-regulation-134253008.html [last accessed Jul. 26, 2016]. 3 pages.
[No Author Listed], Overview of commercial buildings, 2003 Technical report. Commercial Buildings Energy Consumption Survey: United States Department of Energy. 2008:1-20.
NERC Resources Subcommittee, Balancing and frequency control. North American Electric Reliability Corporation. Technical Report. Jan. 26, 2011. 53 pages.
PJM, PJM Manual 12: Balancing Operations. Review 27. Dec. 20, 2012. 104 pages.
Braune et al., Whole building control system design and evaluation: simulation-based assessment. Cross-Task Team on Optimal Building Controls Design and Platform. 2012:1-128.
Braune, Reducing energy costs and peak electrical demand through optimal control of building thermal thermal storage. ASHRAE. 1990;96:876-88.
Brooks et al., Demand Dispatch. IEEE Power and Energy Magazine. May 2010;8(3):20-9.
Callaway et al., Achieving controllability of electric loads. Proc IEEE. 2011; 99(1):184-99.
Callaway, Tapping the energy storage potential in electric loads to deliver load following and regulation, with application to wind energy. Energy Cony Manag. May 2009;50(5):1389-400.
Christakou et al., GECN: Primary Voltage Control for Active Distribution Networks via Real-Time Demand-Tesponse. IEEE Trans Smart Grid. Mar. 2014;5(2):622-31. 10 pages.
Duarte et al., Prioritizing and visualizing energy management and control system data to provide actionable information for building operators. Western Energy Policy Research Conference. Aug. 25-26, 2011:1-14.

Elmahdy et al., A simple model for cooling and dehumidifying coils for use in calculating energy requirements for buildings. ASHRAE Trans. Jun. 1, 1977;83(2):103-17.
Escriva et al., Integral management system for the energy efficiency improvement in commercial facilities: application to the polytechnic University of Valencia. International Conference on Renewable Energy and Power Quality. Apr. 15-17, 2009:1-5.
Eyer et al., Energy storage for the electricity grid: Benefits and market potential assessment guide. Sandia National Laboratories Report, Study for the DOE Energy Storage Systems Program. 2010:1-232.
Hao et al., Ancillary service for the grid via control of commercial building HVAC systems. American Control Conference. 2013:467-72.
Hao et al., Ancillary service to the grid through control of fans in commercial building HVAC systems. IEEE Trans Smart Grid. Jul. 2014;5(4):2066-74.
Hao et al., How demand response from commercial buildings will provide the regulation needs of the grid. 50th Annual Allerton Conference on Communication, Control, and Computing. Oct. 5, 2012;1908-13.
Hirst et al., Electric power ancillary services. Technical report. Oak Ridge National Laboratory. 1996:1-54.
Huang et al., Dynamic simulation of energy management control functions for HVAC systems in buildings. Energy Conv Manag. May 2006;47(7-8):926-43.
Keeney et al., Applications of building precooling to reduce peak cooling requirements. ASHRAE Trans. 1997;103(1):463-9. 17 pages.
Kiliccote et al., Advanced controls and communications for demand response and energy efficiency in commercial buildings. Second Carnegie Mellon Conference in Electric Power Systems: Monitoring, Sensing, Software and Its Valuation for the Changing Electric Power Industry. Pittsburgh, PA. LBNL-59337. Jan. 2006. 11 pages.
Kirby, Frequency regulation basics and trends. US DoE. ORNL/TM-2004/291, Oak Ridge National Laboratory. Dec. 2004. 32 pages.
Koch et al., Modeling and control of aggregated heterogeneous thermostatically controlled loads for ancillary services. Proc Power Syst Comp Conf. Aug. 22-26, 2011:1-7.
Kundu et al., Modeling and control of thermostatically controlled loads. Proc 17th Power Sys Comput Conf. 2011:1-12.
Lin et al., Commercial building HVAC system in power grid ancillary services. University of Florida. Technical Report. 2013. 7 pages.
Lin et al., Experimental evaluation of frequency regulation from commercial building HVAC systems. IEEE Trans Smart Grid. 2015;6(2):776-83.
Lin et al., Low-Frequency Power-Grid Ancillary Services From Commercial Building HVAC Systems. IEEE Smart Grid Comm 2013 Symposium—Demand Side Management, Demand Response, Dynamic Pricing. 2013;169-74.
Makarov et al., Assessing the value of regulation resources based on their time response characteristics. Pacific Northwest National Laboratory. Technical Report. 2008:1-83.
Makarov et al., Operational impacts of wind generation on California power systems. IEEE Trans Power Sys. 2009; 24(2):1039-50.
Mathieu et al., State estimation and control of electric loads to manage real-time energy imbalance. IEEE Trans Power Systems. Feb. 2013;28(1);430-40.
Mathieu et al., State estimation and control of heterogeneous thermostatically controlled loads for load following. 45th International Conference on System Sciences. 2012: 2002-11.
Mathieu, Modeling, analysis, and control of demand response resources. Dissertation. Ernest Orlando Lawrence Berkeley National Laboratory. University of California, Berkeley. May 2012. 182 pages.
Meyn et al., Ancillary Service to the Grid Using Intelligent Deferrable Loads. arXiv:1402.4600. Feb. 19, 2014. 30 pages.
Meyn et al., Markov Chains and Stochastic Stability. Cambridge Mathematical Library. Cambridge University Press, Cambridge. Sep. 2005. 567 pages.

(56) References Cited

OTHER PUBLICATIONS

Meyn et al., Randomized Policies for Demand Dispatch. SIAM Conference on Control & Its Applications. Maison de la Mutualité, Paris, France. Jul. 8-10, 2015. CT15 Abstracts. MS32. 103-4.

Meyn et al., Spectral Decomposition of Demand-Side Flexibility for Reliable Ancillary Services. International Conference on System Sciences. Kauai. Presentation. Jan. 5-8, 2015. 71 pages.

Meyn et al., The value of volatile resources in electricity markets. 49th IEEE Conference on Decision and Control. Dec. 15-17, 2010: 1029-36.

Oldewurtel et al., Building control and storage management with dynamic tariffs for shaping demand response. 2nd IEEE PES International Conference and Exhibition on Innovative Smart Grid Technologies. Dec. 5-7, 2011:1-8.

Pasupathy et al., Phase change material-based building architecture for thermal management in residential and commercial establishments. Renewable and Sustainable Energy Reviews. Jan. 2008; 12(1):39-64.

Ruiz et al., A direct load control model for virtual power plant management. IEEE Transactions on Power Systems. May 2009;24(2):959-66.

Schweppe et al., Homeostatic Utility Control. IEEE Transactions on Power Apparatus and Systems. 1980;PAS-99(3):1151-63.

Smith et al., Utility Wind Integration and Operating Impact State of the Art. IEEE Transactions on Power Systems. Aug. 2007;22(3):900-8.

Steffes, Grid-interactive renewable water heating: Analysis of the economic and environmental value. steffes.com/LiteratureRetrieve. aspx?ID=72241 [last accessed Jan. 15, 2015]. 16 pages.

Tashtoush et al., Dynamic model of an HVAC system for control analysis. Energy. Jul. 2005;30(10):1729-45.

Todd et al., Providing reliability services through demand response: A preliminary evaluation of the demand response capabilities of Alcoa Inc. Oak Ridge National Laboratory. ORNL/TM-2008/233. Jan. 2009:1-60.

Vu et al., Benefits of fast-response storage devices for system regulation in ISO markets. IEEE Power Energy Society General Meeting. 2009:1-8.

Watson et al., Strategies for demand response in commercial buildings. Proceedings of the 2006 ACEEE Summer Study on Energy Efficiency in Buildings. Pacific Grove, CA. Aug. 18-13, 2006. LBNL-60616. 14 pages.

Xu et al., Peak demand reduction from pre-cooling with zone temperature reset in an office building. ACEEE Summer Study on Energy Efficiency in Buildings. 2004:376-86.

Zhao et al., Evaluation of commercial building HVAC systems as frequency regulation providers. Energy Bldg. 2013;67:225-35.

Wikipedia, "Control loop" <https://en.wikipedia.org/wiki/Control-_loop> downloaded Apr. 16, 2018. (Year: 2018)

PCmag "control loop" <https://www.pcmag.com/encyclopedia/term/40309/control-loop> downloaded Apr. 16, 2018. (Year: 2018).

\* cited by examiner

COMFORTABLE, ENERGY-EFFICIENT CONTROL OF A HEATING, VENTILATION, AND AIR CONDITIONING SYSTEM

RELATED APPLICATIONS

Application PCT/US2014/069772 claims priority under 35 U.S.C. § 119(e) to U.S. Provisional Application Ser. No. 61/915,285, entitled "COMFORTABLE ENERGY-EFFICIENT CONTROL OF AN AIR HANDLING UNIT FOR A VARIABLE-AIR-VOLUME SYSTEM" filed on Dec. 12, 2013, which is herein incorporated by reference in its entirety.

GOVERNMENT SUPPORT

This invention was made with Government support under Grant Nos. CNS-0931885 and ECCS-0955023 awarded by the National Science Foundation. The Government has certain rights to this invention.

BACKGROUND

In the United States, buildings are responsible for more than 40% to the total energy consumption while heating, ventilation, and air conditioning (HVAC) systems account for 50% of the energy consumed in the buildings [1]. Poor design and inefficient operation of the HVAC system lead to a significant amount of energy wastage [2].

Though it is possible to retrofit buildings with high efficiency HVAC equipment, doing so requires a substantial amount of investment [3]. In contrast, improving the control algorithms (that operate the HVAC system) to reduce energy usage is far more cost effective. Therefore, many researchers have recently focused on developing advanced control algorithms to reduce energy usage in the buildings; see [5], [6], and references therein, which are expressly incorporated herein by reference in their entirety.

SUMMARY

Some embodiments provide a method of controlling at least one heating, ventilation, and/or air conditioning unit. The method comprises receiving an indication of measured occupant load; and sending a control signal to the at least one heating, ventilation, and/or air conditioning unit.

In some embodiments, there is provided at least one computer-readable storage medium encoded with computer-executable instructions that, when executed by at least one computer, cause the at least one computer to perform a method of operating a computing device of a system that controls least one heating, ventilation, and/or air conditioning unit. The method comprises receiving an indication of measured occupant load; and sending a control signal to the at least one heating, ventilation, and/or air conditioning unit.

Further embodiments provide a system for controlling at least one heating, ventilation, and/or air conditioning unit. The system comprises at least one computer configured to receive an indication of measured occupant load; and send a control signal to the at least one heating, ventilation, and/or air conditioning unit.

The foregoing is a non-limiting summary of the invention, which is defined by the attached claims.

DETAILED DESCRIPTION

Figure 1:
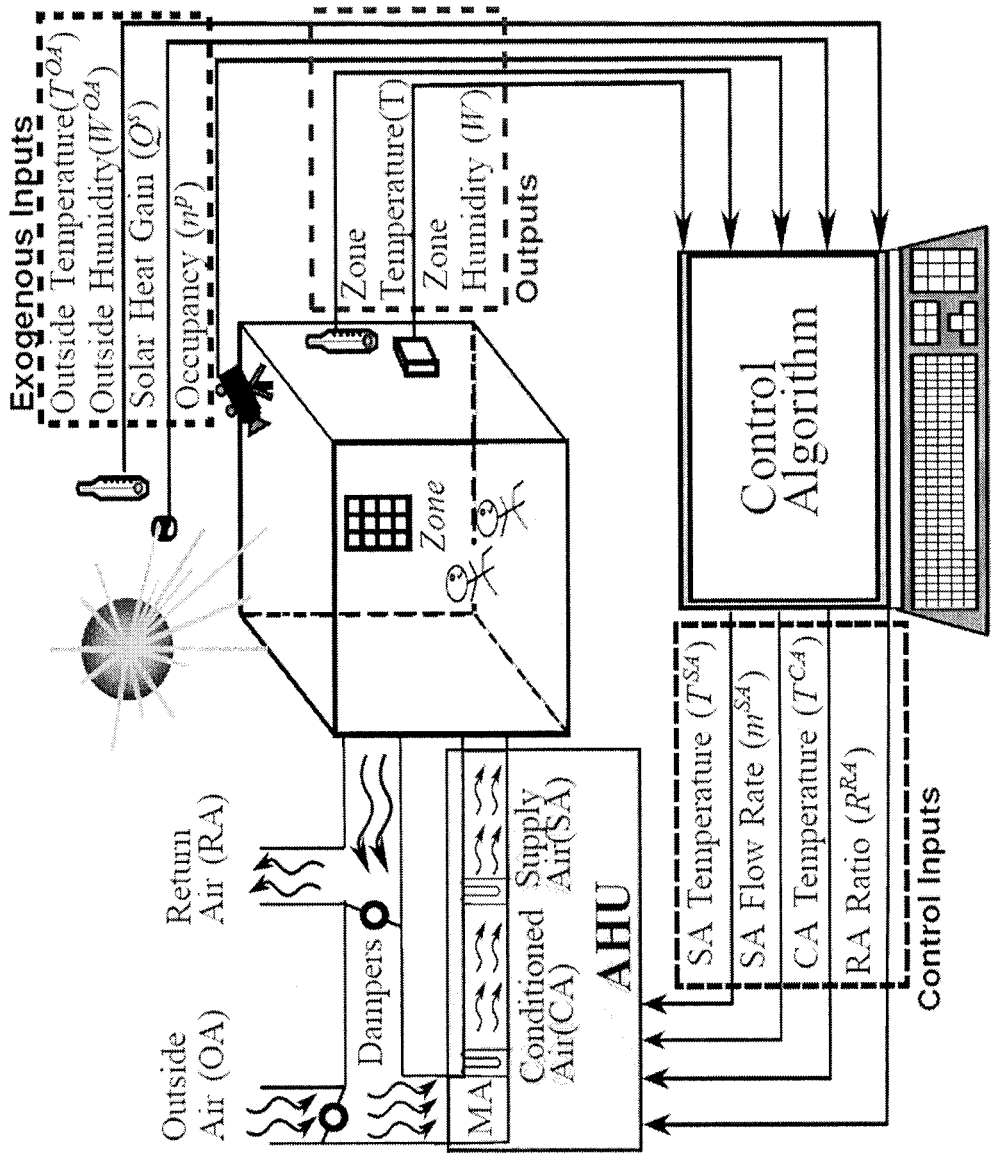
FIG. 1 is a schematic diagram of an exemplary single-zone variable air volume-based HVAC system and implementation of a control algorithm for indoor climate control in which some embodiments may be implemented.

The inventors have recognized and appreciated that an HVAC system may be more valuable with a capability to provide higher energy efficiency while maintaining the indoor air quality and comfort by measuring real-time occupancy. The system may control multiple inputs of the system based on such occupancy without requiring complex control algorithms. Such an approach enables an HVAC system's energy efficiency to be simply and easily improved without significant impact on indoor air quality and comfort.

Solutions for improving the energy efficiency of an HVAC system while maintaining the indoor air quality and comfort traditionally have used design occupancy or scheduled occupancy as bases for controlling the system. Other solutions have used complex control algorithms. The inventors have recognized and appreciated that such solutions are disadvantageous for a variety of reasons. First, design occupancy and scheduled occupancy are limited to set inputs (design and schedule) that do no adapt to current conditions, and so whatever improvement in efficiency they might provide is very limited. Second, the complex control algorithms require accurate and complex models of all the components of the building and system, which can be costly.

The inventors have recognized and appreciated the advantages of real-time measuring of occupancy without using complex control algorithms. Such an approach may provide most or all of the improvements in energy efficiency provided by complex control algorithms without the added complexity and cost of those, and without providing significantly lower indoor air quality and comfort.

Disclosed herein are embodiments of an HVAC control system that provides energy efficiency and good indoor air quality and comfort. In some embodiments, the control system generates control inputs to an air handling unit (AHU) or variable-air-volume (VAV) box. These control inputs may be generated based on one or more measured conditions. One such condition may be occupancy load.

As a specific example, in a VAV HVAC system for commercial buildings, a building may be divided into a number of zones, where a zone may be a room or a collection of rooms. The air leaving the zones may be mixed with outside air based on the value of a return air ratio (which may be a control input), and the mixed air may be sent to one or more AHUs. The air leaving the cooling coil in an AHU may be called conditioned air, which may be cooled down to conditioned air temperature to reduce the humidity ratio. The conditioned air goes to the VAV box of each zone, where the conditioned air may be heated up by using the heating coils before being supplied to the zone. The air supplied to the zone may be called supply air. The flow rate of the supply air may be controlled through dampers inside the VAV box. In some embodiments, four control inputs may be decided for these multi-zone VAV systems. Two of the control inputs (the return air ratio and conditioned air temperature) may be decided at the AHU while the other two control inputs may be decided at the VAV box (the supply air temperature and flow rate).

In contrast to conventional control strategies used in buildings that use only zone temperature measurements, embodiments described herein may alternatively or additionally use one or more of measurements of occupancy, zone humidity, and/or outside weather. Occupancy here may mean number of people in a zone. The control inputs at the VAV box, the supply air temperature and the supply air flow rate, may be determined by the conventional controllers in such a way that the zone temperature is maintained in specific ranges based on predetermined occupancy schedules. While the control inputs at the AHU may usually be kept constant at predetermined values irrespective of whether the building is occupied, this is inefficient in terms of energy usage because the indoor climate is maintained even during unoccupied times.

A significant amount of energy can be saved by using real-time occupancy measurements (instead of using predefined occupancy schedules) to decide zone-level control commands at the VAV boxes, while the control inputs at the AHU are kept constant. The inventors have recognized and appreciated that it is possible to improve the energy efficiency further by varying the AHU inputs in addition to the inputs at the VAV box, which may be done instead of or in addition to varying other control inputs. In fact, a control strategy using an economizer does precisely that, but it only affects one control variable, i.e., return air ratio. The conditioned air temperature can also be varied to reduce energy use based on additional measurements. A substantial amount of energy can be saved—while maintaining thermal comfort and indoor air quality (IAQ)—by not only controlling the inputs at the VAV box but also controlling the inputs at the AHU and using the measurements of occupancy, zone temperature and humidity, and/or outside weather. Information about real-time occupancy measurements maybe found in [4], which is hereby incorporated by reference in its entirety.

In a single-zone VAV system, one AHU may serve only one zone and heating coils may be inside the AHU. Four control inputs that may be determined are return air ratio, conditioned air temperature, supply air temperature, and supply air flow rate. Though the control algorithms are presented for a single-zone here, they are also applicable to multiple zones.

Papers [6], [7], [8], [9], [10], and [11], which are expressly incorporated herein by reference in their entireties, either compare complex model predictive control (MPC) methods with conventional controllers, or compare simple feedback-based methods with the conventional controllers. However, they do not compare all three, i.e., the conventional, simple feedback, and complex model predictive control methods/controllers. These papers do not investigate how much energy savings are possible with a controller that is less complex and easier to implement as compared to a MPC controller, and uses the same amount of information as used by a MPC controller. The inventors have recognized and appreciated that it is advantageous to compare a simple feedback controller, a complex MPC controller, and a conventional controller. Moreover, these papers do not show the effect of the type of measurements on the controller's performance. The inventors have recognized and appreciated that it is advantageous to compare the value of measurements and control inputs in the performance of feedback and MPC controllers and to apply such knowledge to a practical implementation. This is because additional sensors imply extra investment and effort, but using additional measurements may not always result in significant energy savings. The inventors have recognized and appreciated that the feedback controller may perform as well as a MPC controller provided the same measurements and that occupancy measurements are important in minimizing energy usage.

The controllers in the above mentioned papers control a maximum of three variables, though there are at least four variables that can be controlled. The inventors have recognized and appreciated that significantly improved efficiency and comfort may be achieved by controlling at least four variables: supply air temperature, supply air flow rate, conditioned air temperature, and/or return air ratio. Also, the papers mentioned above do not study the effect of an individual control input on the controllers performance. Furthermore, these papers either do not include the conditioned air humidity ratio or they assume constant humidity ratio. However, the conditioned air humidity ratio may depend on the conditioned air temperature, as the dependency of conditioned air temperature and humidity can have a significant impact on energy consumption and thermal comfort.

Implementation of the System

FIG. 1 shows a schematic of an exemplary single-zone VAV-based HVAC system for commercial buildings, along with a schematic of a controller's implementation. In this type of system, a part of the air exhausted from the zone, which may be called return air (RA), may be mixed with the outside air (OA) before being sent to the AHU. The air sent to the AHU may be called mixed air (MA). The MA may be passed through the cooling coils inside the AHU, which may condition the MA to temperature $T^{CA}$ and humidity ratio $W^{CA}$. The air leaving the cooling coils may be called conditioned air (CA), which is usually cold and dry. The CA may be passed through the heating coils in the AHU, which may only heat up the air based on the zone temperature (T). The air leaving the heating coils at temperature ($T^{SA}$) and humidity ratio ($W^{SA}$), which may be called supply air (SA), may be supplied to the zone. The humidity ratio of the SA ($W^{SA}$) may be the same as the humidity ratio of the CA, i.e., ($W^{SA}=W^{CA}$), since reheating may not change the humidity ratio.

A control algorithm may have the task to determine the control inputs—SA temperature ($T^{SA}$), SA flow rate ($m^{SA}$), CA temperature ($T^{CA}$), and RA ratio ($R^{RA}$)—in such a way that thermal comfort and IAQ are maintained in the zone. The simulation experiments performed by the inventors (as discussed below) use a hygro-thermal (humidity and temperature) dynamics model and an energy consumption model as a function of control signals and exogenous inputs. A discrete-time hygro-thermal dynamics model with k being the discrete time index can be expressed as $$X(k+1)=f(X(k),u(k),v(k)),X=[T^TW]^T, \quad (1)$$

where $u(k)=[m^{SA}(k),T^{SA}(k),T^{CA}(k),R^{RA}(k)]^T$ is the control input vector (command), while the exogenous inputs vector v(k) may consist of the outside temperature, outside humidity ratio, solar heat gain, and occupancy, i.e., $v(k)=[T^{OA}(k), W^{OA}(k),Q^s(k),n^P(k)]^T$. The total energy consumption during the time Δt between time indexes k−1 and k may be denoted by E(k), which may include energy used in cooling, reheating, and mechanical energy in pushing the air though the building. The energy consumption may be dependent on the enthalpies of MA, RA, CA, OA, and SA, which may be represented by $h^{MA}$, $h^{RA}$, $h^{CA}$, $h^{OA}$, and $h^{SA}$, respectively. For a single zone with four walls, the state dimension of the hygro-thermal dynamics model may be 10, i.e., X∈R10. Details of the enthalpies, energy, and hygro-thermal dynamics model are available in [12].

Control Algorithms

The four control algorithms (BL, Z-FC, A-FC, and A-MPC) may have information requirements and complexity, as summarized in Table I.

be performed, i.e., $T^{SA}=T^{CA}$ and SA flow rate may be set to the minimum allowed value (see Eq. 2). In the cooling mode, $T^{SA}=T^{CA}$, but the SA flow rate may be varied to maintain the desired set-point $T^{set}$ in the zone. Note that the

TABLE I

OVERVIEW OF THE CONTROL ALGORITHMS IN TERMS OF THE AMOUNT OF INFORMATION REQUIRED AND COMPLEXITY.

| Control Algorithms | Controllable Inputs | Fixed Inputs | Measurements Required | Predictions Required | Model Required | Computation Requirements | Overall Complexity |
|---|---|---|---|---|---|---|---|
| BL | $T^{SA}, m^{SA}$ | $T^{CA}, R^{RA}$ | T | — | No | Very Low | Very Low |
| Z-FC | $T^{SA}, m^{SA}$ | $T^{CA}, R^{RA}$ | T, $n^p$ | — | No | Very Low | Low |
| A-FC | $T^{SA}, T^{CA}, m^{SA}, R^{RA}$ | — | T, W, $n^p$, $T^{OA}, W^{OA}$ | — | No | Medium | Medium |
| A-FC special case 1 | $T^{SA}, m^{SA}, R^{RA}$ | $T^{CA}$ | T, W, $n^p$, $T^{OA}, W^{OA}$ | — | No | Medium | Medium |
| A-FC special case 2 | $T^{SA}, T^{CA}, m^{SA}$ | $R^{RA}$ | T, W, $n^p$, $T^{OA}, W^{OA}$ | — | No | Medium | Medium |
| A-MPC | $T^{SA}, T^{CA}, m^{SA}, R^{RA}$ | — | T, W, $n^p$, $T^{SA}, m^{SA}$ | $T^{OA}, W^{OA}, Q^s$ | Yes | High | Very High |
| A-MPC special case 1 | $T^{SA}, m^{SA}, R^{RA}$ | $T^{CA}$ | T, W, $n^p$, $T^{SA}, m^{SA}$ | $T^{OA}, W^{OA}, Q^s$ | Yes | High | Very High |
| A-MPC special case 2 | $T^{SA}, T^{CA}, m^{SA}$ | $R^{RA}$ | T, W, $n^p$, $T^{SA}, m^{SA}$ | $T^{OA}, W^{OA}, Q^s$ | Yes | High | Very High |

Baseline (BL)

Figure 2:
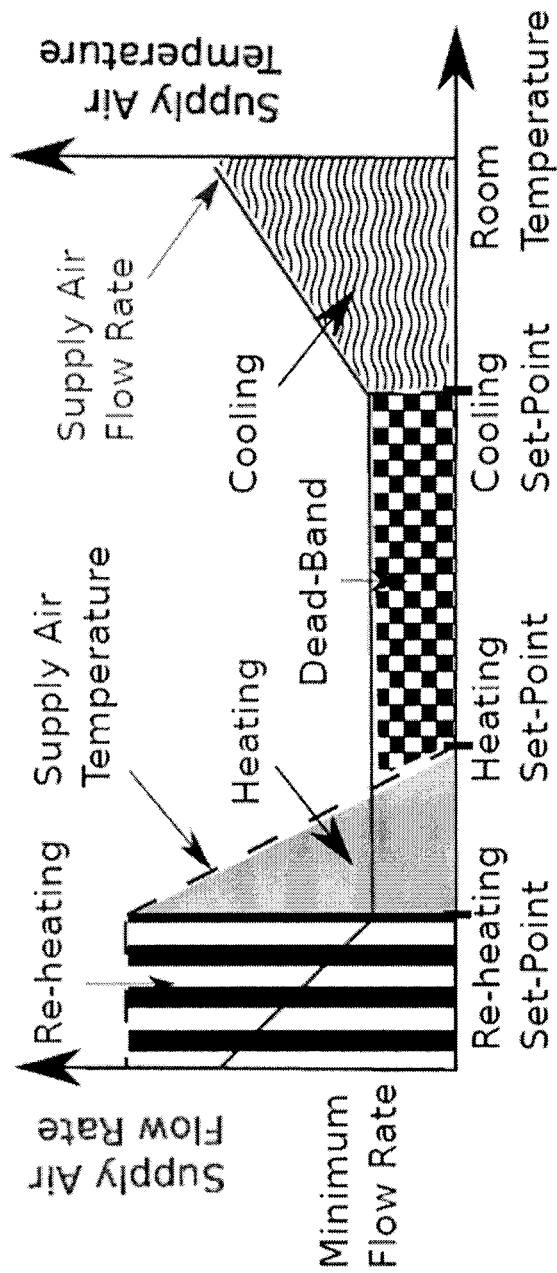
FIG. 2 is a schematic diagram of an exemplary baseline control strategy (referred to as "dual maximum" below).

The dual maximum [13, Chapter 47] functions as the baseline controller, which determines the SA temperature and flow rate based on the zone temperature measurements. The RA ratio and CA temperature may be kept constant at predetermined values. This control logic may be used to control single zones in commercial buildings. In this scheme, the control logic may be divided into four modes: (i) Re-heating, (ii) Heating, (iii) Dead-Band, and (iv) Cooling, FIG. 2 illustrates these four modes schematically. If the zone temperature stays below the "Re-heating Set-Point (RTG)" for more than 10 minutes, the re-heating mode may be activated. Similarly, if the zone temperature remains above the "Cooling Set-Point (CLG)" for more than 10 minutes, the cooling mode may be activated. If the zone temperature stays between RTG and "Heating Set-Point (HTG)" for more than 10 minutes, the heating mode may be activated. If the zone temperature stays between HTG and CLG for more than 10 minutes, the dead-band mode may be activated. In the re-heating mode, the SA temperature may be set to the maximum possible value ($T_{high}^{SA}$), and the SA flow rate may be varied using a proportional-integral-derivative (PID) controller to maintain the zone temperature at a desired set-point $T^{set}$. In the heating mode, the SA flow rate may be set to the minimum allowed value, and the SA temperature may be controlled by a PID controller so that the zone temperature is maintained close to the set-point ($T^{set}$). The minimum allowed value for the flow rate may be determined as follows, which is dictated by ASHARE ventilation standard 62.1 [14]:

$$\text{MinimumAllowedFlowRate} = m_p^{SA} n_d^p + m_{low}^{SA},$$

$$m_p^{SA} = m_p^{OA}/(1-R^{RA}), m_{low}^{SA} = m_z^A A_z/(1-R^{RA}), \quad (2)$$

where $m_p^{OA}$ may be the amount of OA required per person $m_z^A$ may be the amount of OA required per unit area, $m_{low}^{SA}$ may be the minimum amount of SA during unoccupied time, and $A_z$ may be the zone floor area. Since the baseline controller does not use occupancy measurements, the minimum allowed flow rate may be calculated using the designed occupancy $n_d^p$. In the dead-band mode, no re-heating may baseline controller may use nighttime setback; see [4] for the details of set-point $T^{set}$ and nighttime setback.

The BL+Economizer control strategy [13, Chapter 42] may be the same as the BL controller except that the RA ratio may be calculated based on the enthalpies of MA and CA instead of keeping it constant, which may be expressed as $$R^{RA} = 0 \text{ if } h^{CA} < h^{OA} < h^{RA}. \quad (3)$$

Eq. (3) states that the controller may supply 100% OA if the energy required to condition the OA is less than the energy required to condition the RA. Measurements that may be required by this controller are shown in Table I.

Zone-Level Feedback Control (Z-FC)

The Z-FC controller according to some embodiments may require the measurements of occupancy and zone temperature. It may be implemented using technologies used to implement the BL controller described above, with two possible exceptions. First, the minimum allowed flow mentioned in (2) may be calculated based on the measured occupancy instead of the design occupancy as follows:

$$\text{MinimumAllowedFlowRate}(K) = m_p^{SA} n^p(k) + m_{low}^{SA} \quad (4)$$

where $n^p(k)$ may be the occupancy measured at time index k, and $m_p^{SA}, m_{low}^{SA}$ may be computed using (2). Second, the temperature set-points may be determined based on whether the zone is occupied:

$$\left.\begin{array}{l} RTG(t) = T_{RTG}^{unocc} \\ HTG(k) = T_{low}^{unocc} \\ CTG(k) = T_{high}^{unocc} \end{array}\right\} \text{ if } n^p(k) = 0, \quad (5)$$

$$\left.\begin{array}{l} RTG(t) = T_{RTG}^{occ} \\ HTG(k) = T_{low}^{occ} \\ CTG(k) = T_{high}^{occ} \end{array}\right\} \text{ if } n^p(k) \neq 0.$$

The choice of design variables $T_{RTG}^{unocc}, T_{RTG}^{occ}, T_{low}^{unocc}, T_{low}^{occ}, T_{high}^{unocc}, T_{high}^{occ}$ may involve a tradeoff between energy savings and thermal comfort. It may be preferable that the range $[T_{low}^{occ}, T_{high}^{occ}]$ be chosen to ensure that occupants are comfortable if the zone temperature is within this range. A wider range may in general reduce energy consumption, since the controller may be able to reduce reheating during low thermal load conditions and reduce the airflow during high thermal load conditions. Too wide a range may, however, lead to discomfort on the occupants' part. As a general rule, it may be preferable for the parameters for the unoccupied periods to be chosen so that $$[T_{low}^{occ}, T_{high}^{occ}] \subseteq [T_{low}^{unocc}, T_{high}^{unocc}]. \qquad (6)$$

Similarly, choosing the reheating set-points ($T_{RTG}^{unocc}$, $T_{RTG}^{occ}$) far from the heating set-points ($T_{low}^{unocc}, T_{low}^{occ}$) may lead to not only more energy savings but also more discomfort.

AHU-Level Feedback Control (A-FC)

Figure 3:
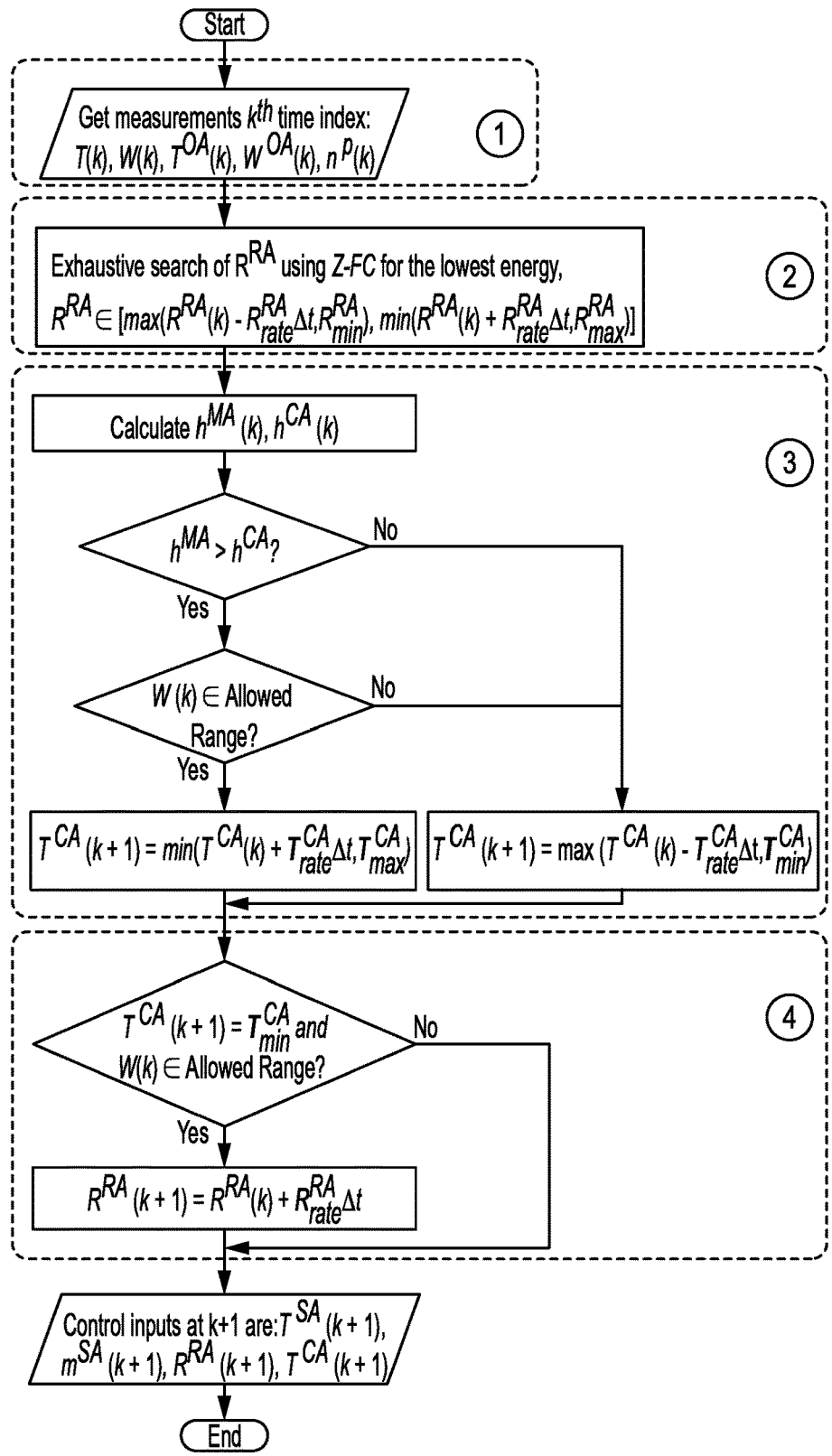
FIG. 3 is a flowchart of an exemplary method of controlling at least one air handling unit according to some embodiments.

The A-FC controller according to some embodiments is a feedback strategy to determine at least four inputs: the SA temperature, SA flow rate, CA temperature, and RA ratio. FIG. 3 is a flowchart that describes the A-FC control algorithm in detail.

In step 1, measurements may be obtained.

In step 2, the RA ratio may be searched in the range $[\max(R^{RA}(k)-R_{rate}^{RA}\Delta t, R_{min}^{RA}), \min(R^{RA}(k)+R_{rate}^{RA}\Delta t, R_{max}^{RA})]$ due to the actuator constraints. The damper position may not change quickly, and the RA ratio may also be limited in its rate of change. In some embodiments, the maximum allowable rate at which the RA ratio can change (increase/decrease) may be $R_{rate}^{RA}$. The maximum and minimum allowable values of the RA ratio may be represented by $R_{max}^{RA}$ and $R_{min}^{RA}$, respectively.

In step 3, the CA temperature may be increased to reduce the energy consumption, and the CA temperature may be decreased when the zone humidity ratio goes farther from the allowable range. The allowable range of the zone humidity ratio during unoccupied and occupied times may be $[W_{low}^{unocc}, W_{high}^{unocc}]$ and $[W_{low}^{occ}, W_{high}^{occ}]$, respectively. That is, the maximum and minimum humidity values may be $W_{low}^{occ}$ and $W_{high}^{occ}$. Based on the same reasons provided for the rate of the RA ratio, there may be a maximum allowable rate $T_{rate}^{CA}$ at which the CA temperature can change. Also, it may be preferable for the CA temperature to always be in the allowable range $[T_{min}^{CA}, T_{max}^{CA}]$.

Step 4 may ensure that the SA flow rate with minimum CA humidity is high enough to maintain the zone humidity within the allowable range. Otherwise the RA ratio may be decreased, which may increase the total flow rate.

The embodiments described above are not all the embodiments possible for a A-FC controller. According to some embodiments (referred to as "special case 1" hereafter), the CA temperature may be kept constant, such as at the minimum value $T_{min}^{CA}$, i.e. $T_{max}^{CA}=T_{max}^{CA}$, and $T_{rate}^{CA}=0$. According to further embodiments (referred to as "special case 1" hereafter), the RA ratio may be kept constant, i.e., $R_{rate}^{RA}=0$.

It may be appreciated that the Z-FC controller may be considered a "special case" of the A-FC when both the RA ratio and CA temperature may be kept constant.

AHU-Level Model Predictive Control (A-MPC)

The A-MPC controller according to some embodiments may also determine at least four inputs as the A-FC controller may, but may do so by using an MPC-based strategy that solves a problem to obtain the control inputs. The A-MPC may require additional information such as a hygro-thermal dynamics model and predictions of outside weather, while A-FC may not require any such additional information. The control inputs over K time indices may be obtained by solving a constrained problem: minimize total energy consumption over that period while maintaining thermal comfort and IAQ. The control inputs may be applied at the current time index k. The problem may be solved again at time index k+1 to compute the control inputs for the next K time instants. The whole process may be repeated as long as the controller continues operating.

To solve the problem described above, the controller may need (i) predictions of the exogenous input v(k) over the time horizon of solving, and (ii) a model of the zone hygro-thermal dynamics as well as its initial state. Predictions of $T^{OA}$, $W^{OA}$, and $Q^s$ (part of v(k)) may be assumed available from weather forecasts. It may be assumed that the instantaneous occupancy measurements are available at the time index k. The predicted occupancy over the prediction horizon K may be assumed to be the same as the measured occupancy at the k-th time period: $n^p(i)=n^p(k)$, $i \geq k$. The models for energy consumption and hygro-thermal dynamics used by the controller may be the ones presented above. An EKF (Extended Kalman Filter)-based state observer may be employed to estimate the state of the plant.

According to some embodiments (referred to as "occupied" hereafter), the measured occupancy at the k-th time index, i.e., at the beginning of the time interval [k$\Delta$t, (k+1)$\Delta$t] may be at least 1. The optimal control inputs for the next K time indices may be obtained by solving the following problem:

$$U^* := \underset{U}{\operatorname{argmin}} G(U), \qquad (7)$$

where $U=[u^T(k), \ldots, u^T(k+K)]^T \in \mathbb{R}^{4(K+1)}$ and $G(U)=\Sigma_{i=k}^{k+K} E(i)$, subject to the following constraints:

$$\left.\begin{array}{l} T_{low}^{occ} \leq T(i) \leq T_{high}^{occ}, \\ W_{low}^{occ} \leq W(i) \leq W_{high}^{occ}, \\ T^{CA}(i) \leq T^{SA}(i) \leq T_{high}^{SA} \\ m_p^{SA} n^p(i) + m_{low}^{SA} \leq m^{SA}(i) \leq m_{high}^{SA} \\ R^{RA}(i) \leq \min(R^{RA}(i-1) + R_{rate}^{RA}\Delta t, R_{max}^{RA}) \\ R^{RA}(i) \geq \max(R^{RA}(i-1) - R_{rate}^{RA}\Delta t, R_{min}^{RA}) \\ T^{CA}(i) \leq \min(T^{CA}(i-1) + T_{rate}^{CA}\Delta t, T_{max}^{CA}) \\ T^{CA}(i) \geq \max(T^{CA}(i-1) - T_{rate}^{CA}\Delta t, T_{min}^{CA}) \end{array}\right\} \forall i = k, \ldots, k+K.$$

The first two constraints may specify the range in which the zone temperature and humidity ratio are allowed to vary. The third constraint may simply take into account actuator capabilities. The fourth constraint may mean that there is a lower and upper bound on the flow rate entering the zone ($m^{SA}$). The lower bound on the flow rate may be the same as for (4), while the upper bound $m_{high}^{SA}$ may reflect the maximum flow rate possible when the dampers in the VAV box are completely open. The last four constraints may correspond to the upper and lower bounds on the RA ratio and CA temperature due to the limitation on the maximum rate at which the RA ratio and CA temperature can change from their current values, which may be the same constraints as for the Z-FC controller.

As in the Z-FC controller, the choice of the design variables $T_{low}^{occ}$, $T_{high}^{occ}$, $W_{low}^{occ}$, $W_{high}^{occ}$ may involve a trade-off between energy savings and potential occupant discomfort.

According to further embodiments (referred to as "unoccupied" hereafter), the measured occupancy at the time index k, i.e., at the beginning of the k-th time period, k may be observed to be 0. At time k, the optimal control inputs for the next K time indices may be obtained by solving the following problem:

$$U^* := \arg\min_U G(U), \quad (8)$$

subject to the following constraints:

$$\left.\begin{array}{l} T_{low}^{unocc} \leq T(i) \leq T_{high}^{unocc} \\ W_{low}^{unocc} \leq W(i) \leq W_{high}^{unocc} \\ m_{low}^{SA} \leq m^{SA}(i) \leq m_{high}^{SA} \\ T^{CA}(i) \leq T^{SA}(i) \leq T_{high}^{SA} \\ R^{RA}(i) \leq \min(R^{RA}(i-1) + R_{rate}^{RA}\Delta t, R_{max}^{RA}) \\ R^{RA}(i) \geq \max(R^{RA}(i-1) - R_{rate}^{RA}\Delta t, R_{min}^{RA}) \\ T^{CA}(i) \leq \min(T^{CA}(i-1) + T_{rate}^{CA}\Delta t, T_{max}^{CA}) \\ T^{CA}(i) \geq \max(T^{CA}(i-1) - T_{rate}^{CA}\Delta t, T_{min}^{CA}) \end{array}\right\} \forall\ i = k, \ldots, k+K.$$

The reason for these constraints may be the same as that explained previously. The constraints on the zone temperature and humidity ratio in the unoccupied mode, however, may be chosen such that $[T_{low}^{unocc}, T_{high}^{unocc}] \supseteq [T_{low}^{occ}, T_{high}^{occ}]$, and $[W_{low}^{unocc}, W_{high}^{unocc}] \supseteq [W_{low}^{occ}, W_{high}^{occ}]$. The choice of the parameters for the unoccupied times may also involve a trade-off. The farther they are from their counterparts during the occupied mode, the greater the energy saving potential may be, but the risk of occupant discomfort when occupancy changes may also be greater.

The embodiments described above are not all the embodiments possible for a A-MPC controller. According to some embodiments (referred to as "special case 1" hereafter), the CA temperature may be kept constant at $T_{min}^{CA}$. According to further embodiments, the RA ratio may be kept constant.

The inventors have recognized and appreciate that the overall complexity of the control algorithms may increase in the order 1) BL, 2) Z-FC, 3) A-FC, and 4) A-MPC. All the controllers may supply the minimum flow rate prescribed by ASHRAE ventilation standard 62.1-2010 [14] during occupied and unoccupied times, which may ensure that IAQ may be maintained by all the controllers. In this way, the problem of analyzing the effect of control inputs on IAQ may be eliminated.

Performance Metrics

The energy consumed by a controller C over a period $\Delta T$ may be $E_C = \sum_{i=1}^{i=L} E_C(i)$, where $L=\Delta T/\Delta t$, and $E_C(i)$ may be the energy consumed by the controller C. An energy related performance metric may be the percent savings over the baseline controller, which may be defined as $$\% \text{ Savings} = (E_{BC} - E_C)/E_{BC}, \quad (9)$$

where $E_C$ and $E_{BC}$ may be the energy consumed by the controller C and the baseline controller, respectively, over the same time period. Two metrics may be chosen for analyzing the thermal comfort related performance of the controllers: (i) Temperature Violation $D_T$, and (ii) Humidity Violation $D_H$, which may be defined as $$D_T = \begin{cases} -T(k) + T_{low}^{occ}, & \text{if } T(k) < T_{low}^{occ} \text{ and } n^p(k) \neq 0 \\ T(k) - T_{high}^{occ}, & \text{if } T(k) > T_{high}^{occ} \text{ and } n^p(k) \neq 0 \\ 0, & \text{otherwise} \end{cases},$$

$$D_H = \begin{cases} -W(k) + W_{low}^{occ}, & \text{if } W(k) < W_{low}^{occ} \text{ and } n^p(k) \neq 0 \\ W(k) - W_{high}^{occ}, & \text{if } W(k) > W_{high}^{occ} \text{ and } n^p(k) \neq 0 \\ 0, & \text{otherwise} \end{cases}.$$

The average temperature violation ($\overline{D}_T$) and the average humidity violation ($\overline{D}_H$) over time $\Delta T$ may be defined as $$\overline{D}_T = \approx \frac{1}{L}\sum_{k=1}^{L} D_T(k), \quad (10)$$

$$\overline{D}_H = \frac{1}{L}\sum_{k=1}^{L} D_H(k),$$

where $L=\Delta T/\Delta t$.

Simulation Experiments

The inventors have conducted simulations in which a model as described above may be used to test performance of a controller.

Building Model Parameters

Figure 4:
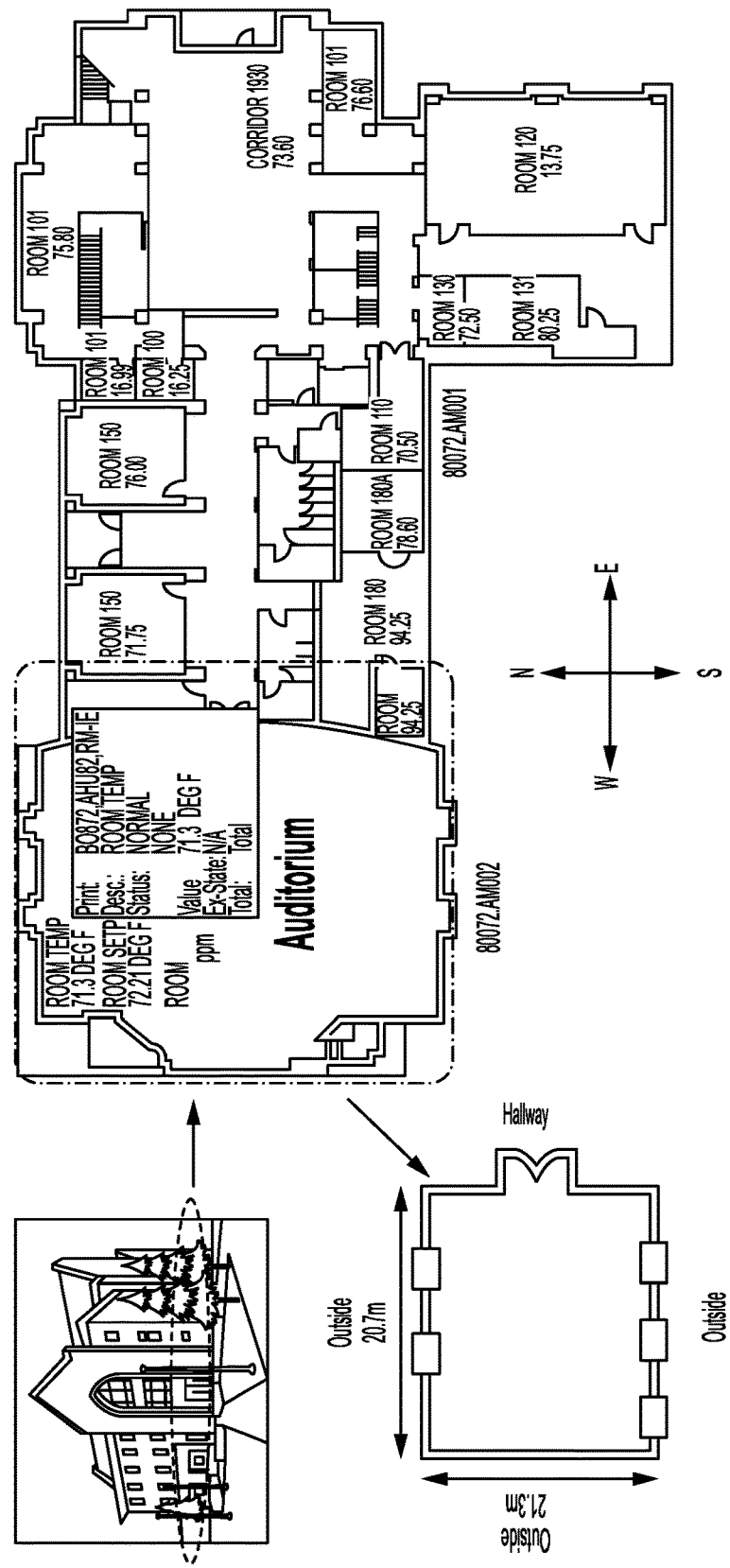
FIG. 4 is a schematic diagram of a simulation environment of an exemplary building (Pugh Hall at the University of Florida) in which some embodiments of the invention may be implemented.

The inventors conducted simulations for a model of an auditorium from the first floor in a building (Pugh Hall) at the University of Florida campus, Gainesville, Fla., which is shown in FIG. 4. This auditorium is served by a dedicated AHU.

Controller Parameters

The maximum flow rate for all the controllers may be chosen as 4.6 kg/s. For the BL and Z-FC controllers, the RA ratio and CA temperature may be assumed to have constant values of 0.6° C. and 12.8° C., respectively. For the BL controller (including BL+Economizer), the temperatures RTG, HTG, and CLG may be set to 21.8° C., 21.9° C., and 23.6° C., respectively, from 6:30 a.m. to 10:30 p.m. During the time 10:30 p.m. to 6:30 a.m., the temperatures: RTG, HTG, and CLG for the BL controller may be chosen as 20.9° C., 21.1° C., and 24.4° C., respectively. This nighttime setback is currently used in the Pugh Hall. The relative humidity of the CA may be assumed constant at 90%. Other design parameters used by the controllers are shown in Table II.

Results

TABLE I

THE DESIGN PARAMETERS USED IN THE VARIOUS CONTROLLERS.

Temperature and Time Related Parameters

| $T^{set}$ (° C.) | $T_{high}^{SA}$ (° C.) | $T_{RTG}^{unocc}$ (° C.) | $T_{RTG}^{occ}$ (° C.) | $T_{low}^{occ}$ (° C.) | $T_{high}^{occ}$ (° C.) | $T_{low}^{unocc}$ (° C.) | $T_{high}^{unocc}$ (° C.) | $T_{min}^{CA}$ (° C.) | $T_{max}^{CA}$ (° C.) | $T_{rate}^{CA}$ $\left(\frac{°\text{ C.}}{\min}\right)$ | K, $\Delta$t, $\Delta$T (no., min, hr) |
|---|---|---|---|---|---|---|---|---|---|---|---|
| .8 | 30.0 | 20.9 | 21.8 | 21.9 | 23.6 | 21.1 | 24.4 | 12.8 | 15.6 | 0.1 | 30, 1, 24 |

TABLE I-continued

THE DESIGN PARAMETERS USED IN THE VARIOUS CONTROLLERS.

Humidity and Other Parameters

| $W_{low}^{unocc}$ $\left(\frac{g}{kg}\right)$ | $W_{low}^{occ}$ $\left(\frac{g}{kg}\right)$ | $W_{high}^{unocc}$ $\left(\frac{g}{kg}\right)$ | $W_{high}^{occ}$ $\left(\frac{g}{kg}\right)$ | $m_p^{OA}$ $\left(\frac{kg}{sec}\right)$ | $m_z^A$ $\left(\frac{kg}{m^2}\right)$ | $m_{high}^{SA}$ $\left(\frac{kg}{sec}\right)$ | $R_{min}^{RA}$ (%) | $R_{max}^{RA}$ (%) | $R_{rate}^{RA}$ $\left(\frac{\%}{min}\right)$ | $n_d^P$ | $A_z$ $(m^2)$ |
|---|---|---|---|---|---|---|---|---|---|---|---|
| .4 | 7.4 | 11 | 11 | 0.0042 | $3.05 * 10^{-4}$ | 4.6 | 0 | 80 | 5 | 210 | 238 |

The inventors compared the performance of BL, BL+Economizer, Z-FC, A-FC, and A-MPC control algorithms, along with the special cases of the A-FC and A-MPC controllers, through simulations. The simulations were performed using MATLAB; while IPOPT [15] was used to solve the problems for the MPC-based controllers. All inventive control schemes are suitable, though some may provide better performance than others.

The hallway shown in FIG. 4 may be assumed to have a constant temperature of 22.2° C. Three types of outside weather conditions: 1) cold (Jan. 14, 2011), hot (Jul. 31, 2011), and pleasant (Mar. 16, 2011), may be considered in Gainesville, Fla. Weather data for this location may be obtained from [16]. The zone may be occupied by 200 people from 8:30 a.m. to 4:30 p.m. This is the current occupancy profile in the auditorium of the Pugh Hall, which is used as a lecture hall.

perature may be allowed to be lower during unoccupied times than what the baseline controller may allow. The second reason is the change of the RA ratio based on the enthalpies of OA, RA, CA, SA in such a way that the total energy may be reduced. During pleasant weather when the OA enthalpy lies between the CA enthalpy and RA enthalpy, the RA ratio may be low as lower energy may be required by the AHU to condition the OA than to condition the RA.

When the outside weather is hot, the RA ratio may be high as less energy is consumed to condition the RA than to condition the hot OA. The third reason is the resetting of the CA temperature based on the zone humidity and enthalpies of MA and CA. When the MA enthalpy is less than the CA enthalpy and the zone humidity is within the allowable range, the CA temperature may increase. Increases in the CA temperature may increase humidity ratio as the CA relative humidity is assumed constant, which may lead to the energy

TABLE III

ENERGY CONSUMPTION, AVERAGE TEMPERATURE VIOLATION, AVERAGE HUMIDITY VIOLATION, AND SAVINGS OVER A 24-HOUR PERIOD WITH VARIOUS CONTROLLERS.

| | Cold | | | | Hot | | | | Pleasant | | | |
|---|---|---|---|---|---|---|---|---|---|---|---|---|
| Control Scheme | E MJ | Savings % | $\overline{D}_T$ ° C. | $\overline{D}_H$ $\frac{g}{kg}$ | E MJ | Savings % | $\overline{D}_T$ ° C. | $\overline{D}_H$ $\frac{g}{kg}$ | E MJ | Savings % | $\overline{D}_T$ ° C. | $\overline{D}_H$ $\frac{g}{kg}$ |
| BL | 3142 | — | 0.008 | 0 | 7598 | — | 0.006 | 0 | 3877 | — | 0.007 | 0 |
| Z-FC | 980 | 68.8 | 0.015 | 0 | 3187 | 58.1 | 0.013 | 0 | 1687 | 56.5 | 0.014 | 0 |
| A-FC special case 1 | 826 | 73.7 | 0.015 | 0 | 2280 | 70.0 | 0.001 | 0.001 | 659 | 83.0 | 0.011 | 0.002 |
| A-FC special case 2 | 797 | 74.6 | 0.012 | 0 | 2595 | 65.8 | 0.005 | 0.003 | 1109 | 71.4 | 0.010 | 0.002 |
| A-FC | 851 | 72.9 | 0.013 | 0 | 2170 | 71.4 | 0.000 | 0.066 | 635 | 83.6 | 0.010 | 0.043 |
| A-MPC special case 1 | 732 | 76.7 | 0.000 | 0 | 2152 | 71.7 | 0.000 | 0 | 615 | 84.1 | 0.000 | 0 |
| A-MPC special case 2 | 815 | 74.1 | 0.000 | 0 | 2580 | 66.0 | 0.000 | 0 | 1103 | 71.5 | 0.000 | 0 |
| A-MPC | 703 | 77.6 | 0.000 | 0 | 2091 | 72.5 | 0.000 | 0 | 607 | 84.4 | 0.000 | 0 |

The total daily energy consumption, average temperature violation, average humidity violation, and percent savings over the baseline controller are shown in Table III. The inventors have recognized and appreciated that all the controllers may result in significant savings over the conventional baseline controller (with and without an economizer). The temperature and humidity violations may be very close to zero for all the controllers, which means that the thermal comfort may be maintained by all the controllers throughout the day.

Without being bound by any theory, the inventors believe that there are multiple reasons for high energy savings using the Z-FC, A-FC and A-MPC controllers as compared to the BL controller. The first reason is the reduction of the flow rate and increase in the allowable temperature range during unoccupied times. Reduction in the flow rate may decrease fan-, conditioning-, and reheating-energy consumption. Increasing the allowable temperature range may result in less reheating energy consumption because the zone temsavings due to less conditioning energy consumed by the cooling coils. Some of these considerations may not be applicable to the Z-FC controller as it may not command the AHU inputs.

Control Inputs and Measurements

The Z-FC controller, which may be a special case of the A-FC controller when both the SA temperature and RA ratio are kept constant while the SA temperature and SA flow rate are varied, results in 56-69% energy savings. If the A-FC controller is allowed to vary the RA ratio as in the special case 1, the additional energy savings over the Z-FC controller may be 5-26%. If the A-FC controller is allowed to vary only the CA temperature instead of the RA ratio as in the special case 2, the additional energy savings may be 4-15%. When the A-FC controller is allowed to vary both the CA temperature and RA ratio, the additional savings over the Z-FC controller may be 4-27%, very similar to the saving in the special case 1 when the CA temperature is kept constant. A similar trend may be observed for the A-MPC controller.

These results suggest that varying the CA temperature with RA ratio may not offer any advantage in terms of energy savings over varying the RA ratio alone. Also, the effect of the SA flow rate and temperature on the energy savings may be maximum among all the control inputs. Therefore, the effect of control inputs on the energy savings may decrease in the order: 1) SA flow rate and temperature, 2) RA ratio, 3) CA temperature.

The Z-FC controller, which may only use the additional measurements of occupancy, may result in 56-69% energy savings over the baseline controller that does not use occupancy measurements. If a controller is allowed to have the additional measurements of zone humidity and outside weather instead of occupancy measurements as in the BL+Economizer controller, the energy savings may be small at about 0-10%. The inventors have recognized and appreciated that this may be because the controller can reduce neither the SA flow rate nor the ventilation rate without knowing the occupancy in a zone. However, if a controller uses the measurements of the zone humidity and outside weather along with the occupancy measurements as in the A-FC and A-MPC controllers, the energy savings may be enormous: almost 71-85%. Therefore, in terms of the importance of measurements, occupancy measurement may be an important factor in reducing the energy usage.

REFERENCES

The following references are incorporated herein by reference in their entireties:

[1] US EIA, "Annual energy review," October 2011.
[2] M. Brambley, D. Hansen, P. Haves, D. Holmberg, S. McDonald, K. Roth, and P. Torcellini, "Advanced sensors and controls for building applications: Market assessment and potential R&D pathways," Pacific Northwest National Laboratory, Tech. Rep., April 2005.
[3] M. Rahman, M. Rasul, and M. Khan, "Energy conservation measures in an institutional building in sub-tropical climate in australia," *Applied Energy*, vol. 87, pp. 2994-3004, October 2010.
[4] S. Goyal, H. Ingley, and P. Barooah, "Occupancy-based zone climate control for energy efficient buildings: Complexity vs. performance," *Applied Energy*, vol. 106, pp. 209-221, June 2013.
[5] J. Siroky, F. Oldewurtel, J. Cigler, and S. Privara, "Experimental analysis of model predictive control for an energy efficient building heating system," *Applied Energy*, vol. 88, pp. 3079-3087, April 2011.
[6] M. Mossolly, K. Ghalib, and N. Ghaddar, "Optimal control strategy for a multi-zone air conditioning system using a genetic algorithm," *Energy*, vol. 34, no. 1, pp. 58-66, January 2009.
[7] S. Wang and X. Jin, "Model-based optimal control of VAV airconditioning system using genetic algorithm," *Building and Environment*, vol. 35, pp. 471-487, January 2000.
[8] N. Nassif, S. Kajl, and R. Sabourin, "Optimization of HVAC control system strategy using two-objective genetic algorithm," *HVAC&R Research*, vol. 11, no. 3, pp. 459-486, 2005.
[9] Y. Agarwal, B. Balaji, S. Dutta, R. Gupta, and T. Weng, "Dutycycling buildings aggressively: The next frontier in HVAC control," in *Information Processing in Sensor Networks (IPSN)*, April 2011, pp. 246-257.
[10] S. Cheng, Y. Chen, C. Chan, T. Lee, H. Chan, J. Qin, Q. Zhou, A. Cheung, and K. Yu, "A robust control strategy for VAV AHU systems and its application," in *Frontiers in Computer Education*, ser. Advances in Intelligent and Soft Computing, S. Sambath and E. Zhu, Eds. Springer Berlin Heidelberg, 2012, vol. 133, pp. 635-642.
[11] Y.-H. Cho, G. Wang, and M. Liu, "Application of terminal box optimization of single-duct air-handling units," *International Journal of Energy Research*, vol. 34, no. 1, pp. 54-66, 2010.
[12] S. Goyal and P. Barooah, "A method for model-reduction of nonlinear building thermal dynamics of multi-zone buildings," *Energy and Buildings*, vol. 47, pp. 332-340, April 2012.
[13] ASHRAE, "The ASHRAE handbook—HVAC applications (SI Edition)," 2011.
[14] ASHRAE, "ANSI/ASHRAE standard 62.1-2010: Ventilation for acceptable air quality," 2010.
[15] A. Wächter and L. Biegler, "On the implementation of an interior-point filter line-search algorithm for large-scale nonlinear programming," *Mathematical Programming*, vol. 106, pp. 25-57, May 2006.
[16] [Online]. Available: www.wunderground.com.
[17] Y. Lin, T. Middelkoop, and P. Barooah, "Issues in identification of control-oriented thermal models of zones in multi-zone buildings," in *IEEE Conference on Decision and Control*, December 2012, pp. 6932-6937.

Computing Environment

Figure 5:
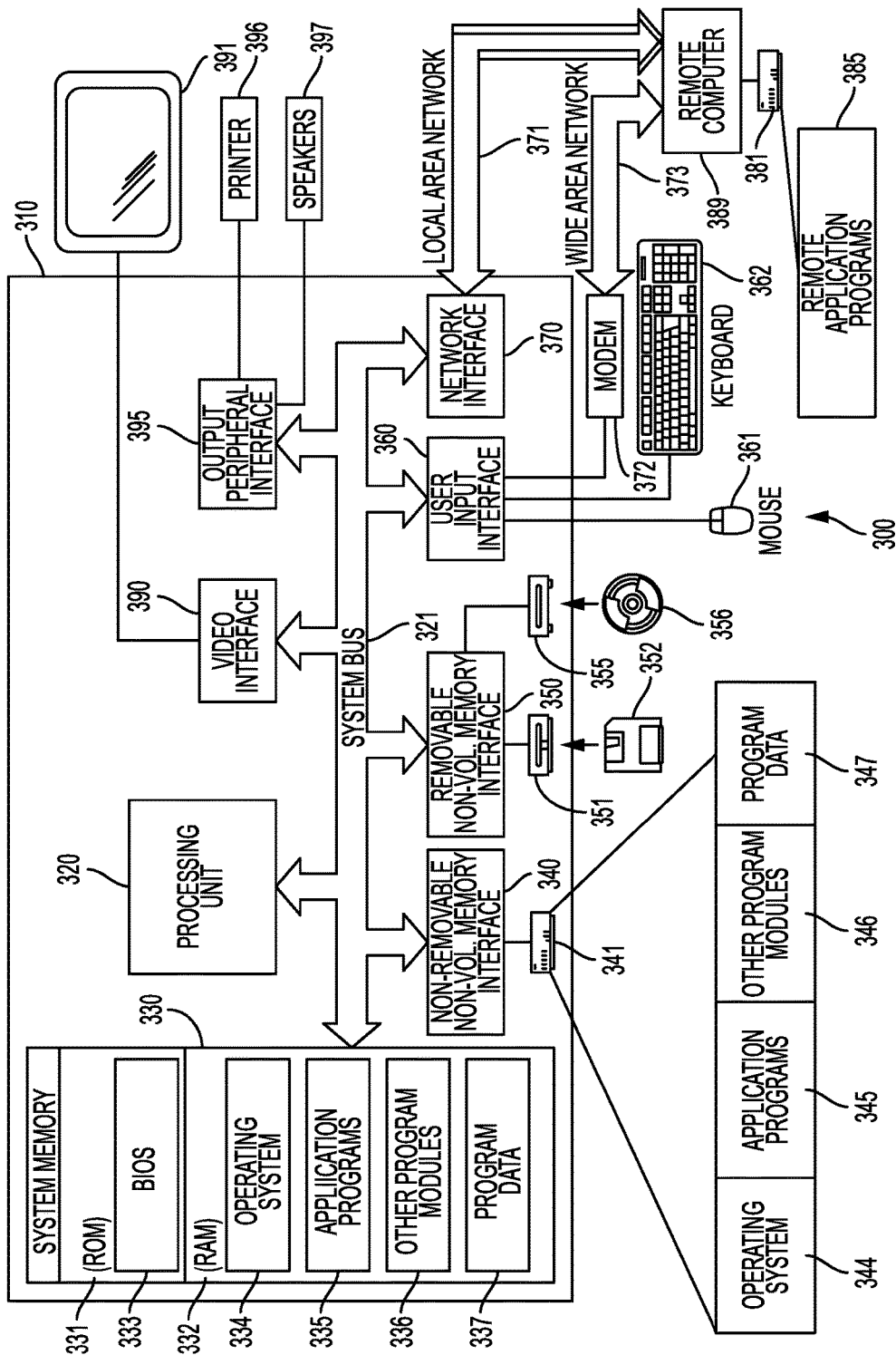
FIG. 5 is a diagram illustrating a computer system on which some embodiments of the invention may be implemented.

Control techniques to generate or use a regulation system at a customer premises may be implemented on any suitable hardware, including a programmed computing system. For example, FIG. 1 illustrates a "Control Algorithm" executing on a computing device. FIG. 5 illustrates an example of a suitable computing system environment 300 on which embodiments of these control algorithms may be implemented. This computing system may be representative of a computing system that implements the described technique of providing ancillary services to a power grid using a customer premises. However, it should be appreciated that the computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments or cloud-based computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 310. Though a programmed general purpose computer is illustrated, it should be understood by one of skill in the art that control algorithms may be implemented in any suitable computing device, which may be an existing HVAC controller. Accordingly, techniques as described herein may be implemented in one or more controllers for HVAC systems, such as in a controller for an AHU and/or a controller for an air flow box or other suitable component. These techniques may be implemented in such controllers as originally manufactured or as a retrofit, such as by changing program memory devices holding programming for such controllers or software download. Thus, some or all of the components illustrated in FIG. 5, though illustrated as part of a general purpose computer, may be regarded as representing portions of a controller or other component in an HVAC system.

Components of computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, and a local bus using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can by accessed by computer 310. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, radio frequency (RF), infrared (IR), and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example and not limitation, FIG. 5 illustrates operating system 334, application programs 335, other program modules 336, and program data 337.

The computer 310 may also include other removable/non-removable, volatile/nonvolatile computer storage media. By way of example only, FIG. 5 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through an non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 5, provide storage of computer readable instructions, data structures, program modules, and other data for the computer 310. In FIG. 5, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball, or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port, or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device, or some other common network node, and typically includes many or all of the elements described above relative to the computer 310, although only a memory storage device 381 has been illustrated in FIG. 5. The logical connections depicted in FIG. 5 include a local area network (LAN) 371 and a wide area network (WAN) 373, but may also include other networks. Such networking environments are commonplace in offices, enterprise-wide computer networks, intranets, and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 5 illustrates remote application programs 385 as residing on memory device 381. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method of controlling at least one heating, ventilation, and/or air conditioning unit, the method comprising:
   receiving an indication of measured occupant load, wherein the measured occupant load comprises at least a zone humidity;
   determining a return air ratio;
   determining a conditioned air temperature based on at least the zone humidity;
   re-determining the return air ratio based on at least the zone humidity; and
   sending a control signal to the at least one heating, ventilation, and/or air conditioning unit, wherein the control signal controls at least one air handling unit to set the return air ratio and the conditioned air temperature.

2. The method of claim 1, wherein:
   receiving the indication of the measured occupant load comprises receiving from at least one sensor node at least a zone occupant quantity and a zone temperature; and
   sending the control signal to the at least one heating, ventilation, and/or air conditioning unit comprises sending a signal that controls at least one variable air volume box to set a supply air flow rate and a supply air temperature based on the measured occupant load.

3. The method of claim 2, wherein the at least one sensor node comprises at least one processor, at least one radio, and at least one sensor.

4. The method of claim 3, wherein the at least one sensor is configured to measure the indication of measured occupant load.

5. The method of claim 3, wherein the at least one processor is configured to execute instructions, encoded on at least one non-transitory computer-readable storage medium, that cause the at least one processor to perform transmitting the indication of measured occupant load via the at least one radio.

6. The method of claim 3, wherein a first system configured for:
   receiving the indication of the measured occupant load from the at least one processor via the at least one radio; and
   transmitting the indication of measured occupant load to at least one second system.

7. The method of claim 1, wherein:
   the measured occupant load further comprises at least a zone occupant quantity, a zone temperature, an outside temperature, and an outside humidity; and
   the control signal further controls, based on the measured occupant load, at least one variable air volume box to set a supply air flow rate and a supply air temperature.

8. The method of claim 1, wherein determining the return air ratio comprises performing an exhaustive search in a range based on at least one actuator constraint.

9. The method of claim 1, wherein determining the conditioned air temperature comprises:
   determining a mixed air enthalpy and a conditioned air enthalpy;
   comparing the mixed air enthalpy and the conditioned air enthalpy;
   if the mixed air enthalpy is greater than the conditioned air enthalpy, determining whether the zone humidity is within an allowed range;
   if the zone humidity is within the allowed range, increasing the conditioned air temperature; and
   if the mixed air enthalpy is not greater than the conditioned air enthalpy or if the zone humidity is not within the allowed range, decreasing the conditioned air temperature.

10. The method of claim 1, wherein re-determining the return air ratio comprises:
    determining whether the zone humidity is within an allowed range; and
    if the zone humidity is not within the allowed range, decreasing the return air ratio.

11. At least one non-transitory computer-readable storage medium encoded with computer-executable instructions that, when executed by at least one computer, cause the at least one computer to perform a method of operating a computing device of a system that controls least one heating, ventilation, and/or air conditioning unit, the method comprising:
    receiving an indication of measured occupant load, wherein the measured occupant load comprises at least a zone humidity;
    determining a return air ratio;
    determining a conditioned air temperature based on at least the zone humidity;
    re-determining the return air ratio based on at least the zone humidity; and
    sending a control signal to the at least one heating, ventilation, and/or air conditioning unit, wherein the control signal controls at least one air handling unit to set the return air ratio and the conditioned air temperature.

12. A system for controlling at least one heating, ventilation, and/or air conditioning unit, the system comprising:
    at least one computer configured to:
    receive an indication of measured occupant load, wherein the measured occupant load comprises at least a zone humidity;

determine a return air ratio;
determine a conditioned air temperature based on at least the zone humidity;
re-determine the return air ratio based on at least the zone humidity; and
send a control signal to the at least one heating, ventilation, and/or air conditioning unit, wherein the control signal controls at least one air handling unit to set the return air ratio and the conditioned air temperature.

13. The system of claim 12, wherein the at least one computer is configured to:
receive the indication of the measured occupant load by receiving from at least one sensor node at least a zone occupant quantity and a zone temperature; and
send the control signal to the at least one heating, ventilation, and/or air conditioning unit by sending a signal that controls at least one variable air volume box to set a supply air flow rate and a supply air temperature based on the measured occupant load.

14. The system of claim 13, wherein the at least one sensor node comprises at least one processor, at least one radio, and at least one sensor.

15. The system of claim 14, wherein the at least one sensor is configured to measure the indication of measured occupant load.

16. The system of claim 14, wherein the at least one processor is configured to execute instructions, encoded on at least one non-transitory computer-readable storage medium, that cause the at least one processor to perform transmitting the indication of measured occupant load via the at least one radio.

17. The system of claim 14, further comprising a first system configured to perform:
receiving the indication of the measured occupant load from the at least one processor via the at least one radio; and
transmitting the indication of measured occupant load to at least one second system.

18. The system of claim 12, wherein:
the measured occupant load further comprises at least a zone occupant quantity, a zone temperature, an outside temperature, and an outside humidity; and
the control signal further controls, based on the measured occupant load, at least one variable air volume box to set a supply air flow rate and a supply air temperature.

19. The system of claim 12, wherein determining the return air ratio comprises performing an exhaustive search in a range based on at least one actuator constraint.

20. The system of claim 12, wherein determining the conditioned air temperature comprises:
determining a mixed air enthalpy and a conditioned air enthalpy;
comparing the mixed air enthalpy and the conditioned air enthalpy;
if the mixed air enthalpy is greater than the conditioned air enthalpy, determining whether the zone humidity is within an allowed range;
if the zone humidity is within the allowed range, increasing the conditioned air temperature; and
if the mixed air enthalpy is not greater than the conditioned air enthalpy or if the zone humidity is not within the allowed range, decreasing the conditioned air temperature.

21. The system of claim 12, wherein re-determining the return air ratio comprises: determining whether the zone humidity is within an allowed range; and if the zone humidity is not within the allowed range, decreasing the return air ratio.

* * * * *